United States Patent
Yano et al.

(10) Patent No.: US 10,506,108 B2
(45) Date of Patent: Dec. 10, 2019

(54) IMAGE PROCESSING APPARATUS GENERATING PRINT DATA, PRINT SYSTEM INCLUDING IMAGE PROCESSING APPARATUS AND PRINTING APPARATUS PRINTING BASED ON PRINT DATA, CALIBRATION CONTROL METHOD IN PRINT SYSTEM, AND STORAGE MEDIUM STORING CALIBRATION CONTROL PROGRAM

(71) Applicant: CANON KABUSHIKI KAISHA, Tokyo (JP)

(72) Inventors: Takaaki Yano, Tokyo (JP); Nobuhiro Kawamura, Nagareyama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/788,019

(22) Filed: Oct. 19, 2017

(65) Prior Publication Data

US 2018/0131818 A1 May 10, 2018

(30) Foreign Application Priority Data

Nov. 9, 2016 (JP) ................................ 2016-218972

(51) Int. Cl.
*H04N 1/00* (2006.01)
*G06K 15/02* (2006.01)

(52) U.S. Cl.
CPC ....... *H04N 1/00087* (2013.01); *G06K 15/027* (2013.01); *G06K 15/1868* (2013.01);
(Continued)

(58) Field of Classification Search
CPC ............................. H04N 1/00; G06K 15/027
See application file for complete search history.

(56) References Cited

U.S. PATENT DOCUMENTS

| 2009/0296116 A1* | 12/2009 | Asai | ................... H04N 1/00002 358/1.9 |
| 2014/0146331 A1* | 5/2014 | Sato | ..................... H04N 1/6097 358/1.9 |
| 2014/0160498 A1* | 6/2014 | Yano | ..................... G06F 3/1208 358/1.9 |

FOREIGN PATENT DOCUMENTS

JP 2014113810 A 6/2014

* cited by examiner

*Primary Examiner* — Frantz Bataille
(74) *Attorney, Agent, or Firm* — Rossi, Kimms & McDowell LLP

(57) ABSTRACT

A print system that is capable of performing calibration of the print system that includes a printing apparatus and an image processing apparatus that supplies image data to the printing apparatus appropriately. The printing apparatus controls execution of first calibration. The image processing apparatus controls execution of second calibration. A management unit manages an execution instruction of system calibration that performs the first calibration and the second calibration continuously. A first sending unit sends an execution command for performing the first calibration based on the execution instruction of the system calibration to the printing apparatus from the image processing apparatus. A second sending unit sends a notice showing that execution of the first calibration in response to the execution command was completed from the printing apparatus to the image processing apparatus. A control unit starts execution of the second calibration when the image processing apparatus receives the notice.

13 Claims, 12 Drawing Sheets

(52) U.S. Cl.
CPC ..... *H04N 1/00037* (2013.01); *H04N 1/00076* (2013.01); *H04N 2201/0094* (2013.01)

FIG. 6

| SYSTEM CALIBRATION SETTING NAME | SECOND CALIBRATION SETTING | FIRST CALIBRATION SETTING | LAST EXECUTION TIME |
|---|---|---|---|
| REGULAR PAPER | REGULAR PAPER | CALIBRATION 1 | 20XX/YY/AA |
| THICK PAPER | THICK PAPER | CALIBRATION 2 | 20XX/YY/BB |
| COATED PAPER | COATED PAPER | CALIBRATION 2 | 20XX/YY/BB |
| THICKEST PAPER | THICKEST PAPER | CALIBRATION 3 | 20XX/YY/CC |
| THICKEST COATED PAPER | THICKEST COATED PAPER | CALIBRATION 3 | 20XX/YY/CC |
| USER SHEET F | USER SHEET F | CALIBRATION 1 | 20XX/YY/AA |
| USER SHEET G | USER SHEET G | CALIBRATION 2 | 20XX/YY/BB |

FIG. 7

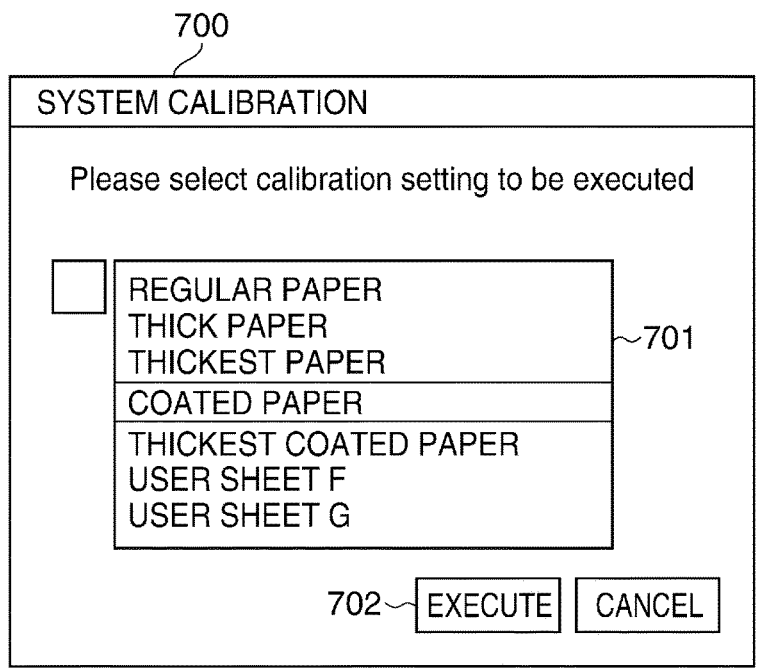

IMAGE PROCESSING APPARATUS GENERATING PRINT DATA, PRINT SYSTEM INCLUDING IMAGE PROCESSING APPARATUS AND PRINTING APPARATUS PRINTING BASED ON PRINT DATA, CALIBRATION CONTROL METHOD IN PRINT SYSTEM, AND STORAGE MEDIUM STORING CALIBRATION CONTROL PROGRAM

BACKGROUND OF THE INVENTION

Field of the Invention

The present invention relates to an image processing apparatus that generates print data, a print system that includes the image processing apparatus and a printing apparatus that prints according to the print data, a calibration control method in the print system, and a storage medium that stores a calibration control program.

Description of the Related Art

There is a known print system that includes an image processing apparatus that generates print data on the basis of a print job received from a client PC and an MFP as a printing apparatus that prints according to the print data that is sent from the image processing apparatus. The print system performs compensation (calibration) so that an output printed matter achieves a predetermined optimal output result even if environment where the MFP is installed varies. The print system performs different types of calibration corresponding to objects of compensation. For example, first calibration is performed when the object of compensation is optimization of a value relevant to image formation (an image formation related value), such as an addition voltage value of each module of the MFP and an output value of laser power. The MFP controls to perform the first calibration when a user operates an operation unit of the MFP. Moreover, second calibration is performed when the object of compensation is optimization of an image processing parameter corresponding to a sheet type. The image processing apparatus controls to perform the second calibration when a user operates an operation unit of the image processing apparatus.

The print system needs to perform system calibration by performing the second calibration after performing the first calibration in order to output the optimal printed matter. In this case, a message showing that the second calibration is required is displayed on a display unit of the MFP after performing the first calibration (for example, see Japanese Laid-Open Patent Publication (Kokai) No. 2014-113810 (JP 2014-113810A)). When checking the message on the display unit of the MFP, the user moves to an installation position of the image processing apparatus and instructs to perform the second calibration by operating the operation unit of the image processing apparatus.

However, when the user forgets an instruction to perform the second calibration even if the message showing that the second calibration is required is displayed, the second calibration will not be performed. As a result, since the system calibration is not performed appropriately, a problem that the optimal printed matter cannot be output occurs.

SUMMARY OF THE INVENTION

The present invention provides a print system, an image processing apparatus, a calibration control method, and a storage medium storing a calibration control program, which are capable of performing calibration of the print system that includes the printing apparatus and the image processing apparatus that supplies image data to the printing apparatus appropriately.

Accordingly, a first aspect of the present invention provides a print system including a printing apparatus that controls execution of first calibration, an image processing apparatus that controls execution of second calibration, a management unit configured to manage an execution instruction of system calibration that performs the first calibration and the second calibration continuously in order of the first calibration and the second calibration by the image processing apparatus, a first sending unit configured to send an execution command for performing the first calibration based on the execution instruction of the system calibration to the printing apparatus from the image processing apparatus, a second sending unit configured to send a notice showing that execution of the first calibration in response to the execution command was completed from the printing apparatus to the image processing apparatus, and a control unit configured to start execution of the second calibration when the image processing apparatus receives the notice.

Accordingly, a second aspect of the present invention provides an image processing apparatus including a communication unit configured to communicate with a printing apparatus that controls execution of first calibration, a calibration execution unit configured to control execution of second calibration that differs from the first calibration, a management unit configured to manage an execution instruction of system calibration that performs the first calibration and the second calibration continuously in order of the first calibration and the second calibration, a sending unit configured to send an execution command for performing the first calibration based on the execution instruction of the system calibration to the printing apparatus, a receiving unit configured to receive a notice showing that execution of the first calibration in response to the execution command was completed from the printing apparatus, and a control unit configured to start execution of the second calibration when the receiving unit receives the notice.

Accordingly, a third aspect of the present invention provides a calibration control method for a print system equipped with a printing apparatus that controls execution of first calibration and an image processing apparatus that controls execution of second calibration, the calibration control method including a management step of managing an execution instruction of system calibration that performs the first calibration and the second calibration continuously in order of the first calibration and the second calibration by the image processing apparatus, a first sending step of sending an execution command for performing the first calibration based on the execution instruction of the system calibration to the printing apparatus from the image processing apparatus, a second sending step of sending a notice showing that execution of the first calibration in response to the execution command was completed from the printing apparatus to the image processing apparatus, and a control step of starting execution of the second calibration when the image processing apparatus receives the notice.

Accordingly, a fourth aspect of the present invention provides a non-transitory computer-readable storage medium storing a control program causing a computer to execute the control method of the third aspect.

According to the present invention, the system calibration that is a color adjustment process in the print system that includes the printing apparatus and the image processing apparatus that supplies image data to the printing apparatus is performed appropriately.

Further features of the present invention will become apparent from the following description of exemplary embodiments with reference to the attached drawings.

BRIEF DESCRIPTION OF THE DRAWINGS

FIG. 6 is a view showing an example of third setting information generated by the image processing apparatus in FIG. 1.

FIG. 7 is a view showing an example of a setting screen displayed on the image processing apparatus in FIG. 1.

DESCRIPTION OF THE EMBODIMENTS

Hereafter, embodiments according to the present invention will be described in detail with reference to the drawings.

Figure 1:
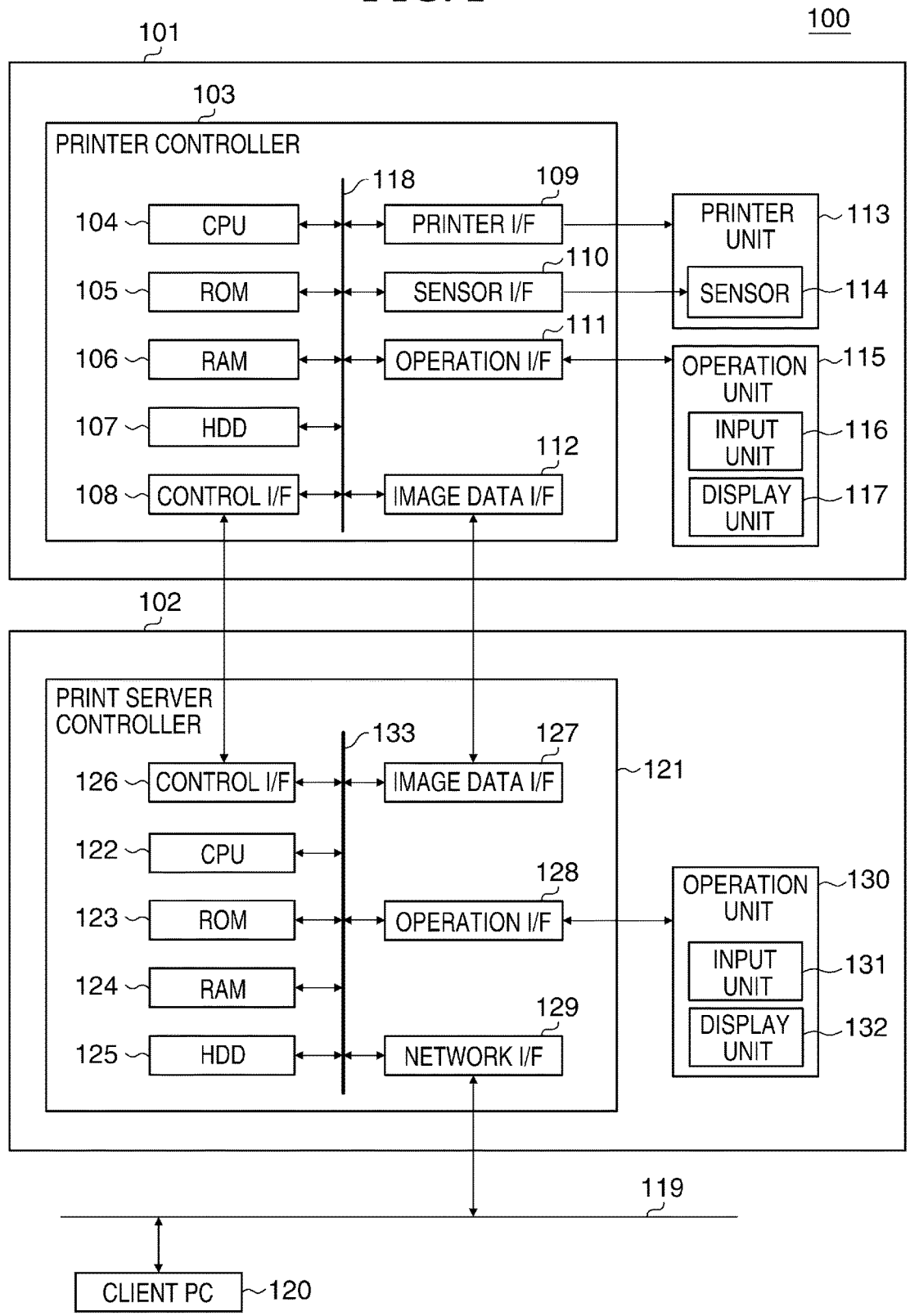
FIG. 1 is a block diagram schematically showing a hardware configuration of a print system according to a first embodiment of the present invention.

FIG. 1 is a block diagram schematically showing a hardware configuration of a print system 100 according to a first embodiment of the present invention.

As shown in FIG. 1, the print system 100 is provided with an MFP (Multi-Function Printer) 101 as a printing apparatus and an image processing apparatus 102. The MFP 101 and the image processing apparatus 102 are connected so as to enable communications. The MFP 101 is provided with a printer controller 103, a printer unit 113, and an operation unit 115. The printer controller 103 is connected with the printer unit 113 and the operation unit 115. The printer controller 103 is provided with a CPU 104, a ROM 105, a RAM 106, an HDD 107, a control I/F 108, a printer I/F 109, a sensor I/F 110, an operation I/F 111, and an image data I/F 112. The CPU 104, ROM 105, RAM 106, HDD 107, control I/F 108, printer I/F 109, sensor I/F 110, operation I/F 111, and image data I/F 112 are mutually connected through a system bus 118. The printer unit 113 is provided with a sensor 114. The image processing apparatus 102 is provided with a print server controller 121 and an operation unit 130, and the print server controller 121 is connected with the operation unit 130. The print server controller 121 is provided with a CPU 122, a ROM 123, a RAM 124, an HDD 125, a control I/F 126, an image data I/F 127, an operation I/F 128, and a network I/F 129. The CPU 122, ROM 123, RAM 124, HDD 125, control I/F 126, image data I/F 127, operation I/F 128, and network I/F 129 are mutually connected through a system bus 133.

The MFP 101 obtains print data, such as setting data about printing and image data for printing, from the image processing apparatus 102, and prints on a recording sheet according to the print data concerned. The printer controller 103 integrally controls the entire MFP 101. The CPU 104 performs various processes of a software module 200 in FIG. 2A by running programs stored in the ROM 105 and the HDD 107. The ROM 105 stores data and programs that are performed by the CPU 104. The RAM 106 is used as a working area of the CPU 104, and the RAM 106 is used as a temporary storage area for various data. The HDD 107 stores a boot program and various data for the MFP 101.

The control I/F 108 controls data communication, such as sending and receiving of the setting data about printing, with the image processing apparatus 102. The printer I/F 109 performs data communication with the printer unit 113. For example, the printer I/F 109 sends the print data obtained from the image processing apparatus 102 to the printer unit 113. The sensor I/F 110 performs data communication with the sensor 114. For example, the sensor I/F 110 notifies the sensor 114 of a measurement instruction, and obtains a result of measurement in response to the measurement instruction from the sensor 114. The operation I/F 111 performs data communication with the operation unit 115. The image data I/F 112 obtains image data for printing from the image processing apparatus 102. The printer unit 113 prints the image data obtained onto a recording sheet.

The sensor 114 is arranged between a fixing device and an ejection port that are arranged in a sheet conveyance path (not shown) in the printer unit 113. In the first embodiment, when execution of calibration is instructed, the sensor 114 is notified of the measurement instruction, and a measurement chart including a plurality of color patches is printed on a recording sheet. The sensor 114 reads the measurement chart to measure patch information, such as a spectrum value, a chromaticity value, and a density. The operation unit 115 is provided with an input unit 116 and a display unit 117. The input unit 116 includes operation buttons and an operation key, and receives input information input by the user. For example, the input unit 116 receives a below-mentioned execution instruction of the first calibration of which execution is controlled by the MFP 101. The display unit 117 displays a setting screen for various settings about the MFP 101.

The image processing apparatus 102 receives a print job from an apparatus, such as a client PC 120, connected to a network 119, generates print data for printing the print job, and sends the print data concerned to the MFP 101. The print server controller 121 integrally controls the entire image processing apparatus 102. The CPU 122 performs various processes of a software module 208 in FIG. 2B by running programs stored in the ROM 123 and the HDD 125. The ROM 123 stores data and programs that are performed by the CPU 122. The RAM 124 is used as a working area of the CPU 122, and the RAM 124 is used as a temporary storage area for various data. The HDD 125 stores a boot program and various data for the image processing apparatus 102. The control I/F 126 controls data communication, such as sending and receiving of the setting data about printing, with the MFP 101. The image data I/F 127 sends image data for printing to the MFP 101. The operation I/F 128 performs data communication with the operation unit 130. The network I/F 129 performs data communication with the client PC 120 etc. that is connected to the network 119. The operation unit 130 is provided with an input unit 131 and a display unit 132. The input unit 131 includes operation buttons and an operation key, and receives input information input by the user. For example, the input unit 131 receives an execution instruction of below-mentioned second calibration that is controlled by the image processing apparatus 102 and an execution instruction of system calibration that is performed by performing the second calibration after performing the first calibration. The display unit 132 displays a setting screen for various settings about the image processing apparatus 102. For example, the display unit 132 displays a below-mentioned setting screen shown in FIG. 7 that receives the execution instruction of the system calibration.

Figure 2A:
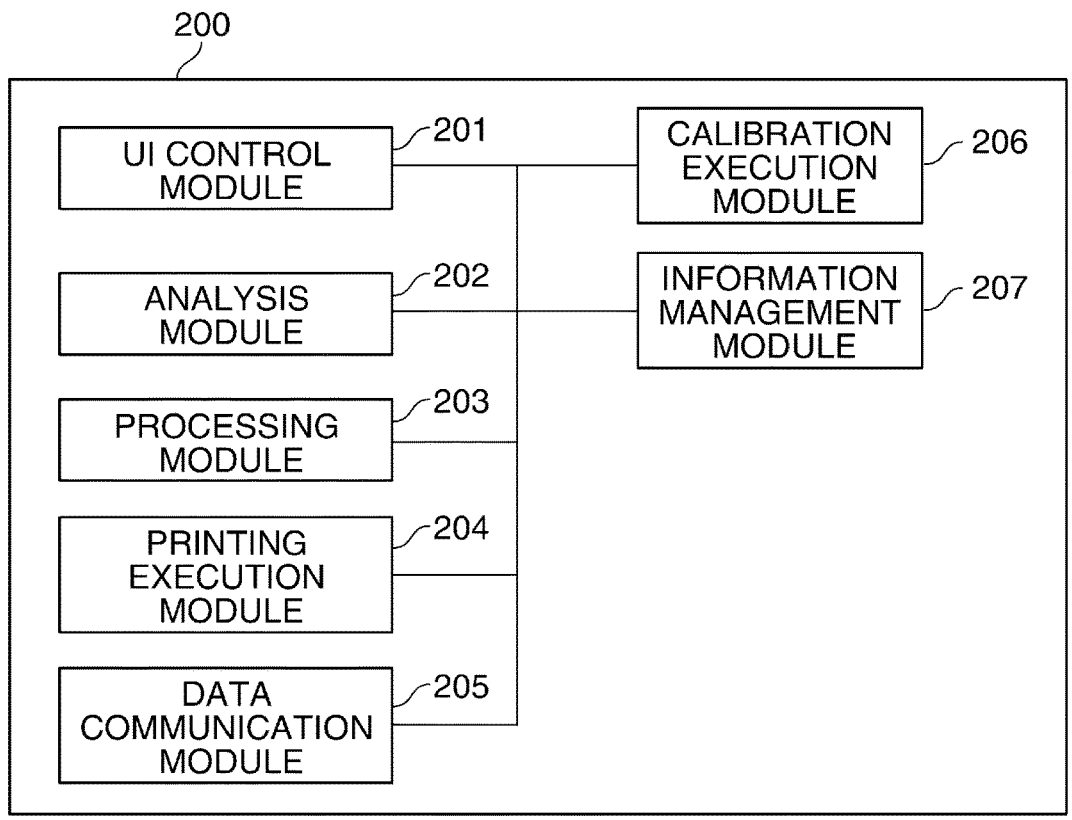
FIG. 2A and FIG. 2B are block diagrams schematically showing configurations of software modules of an MFP and image processing apparatus that constitute the print system in FIG. 1, respectively.
Figure 2B:
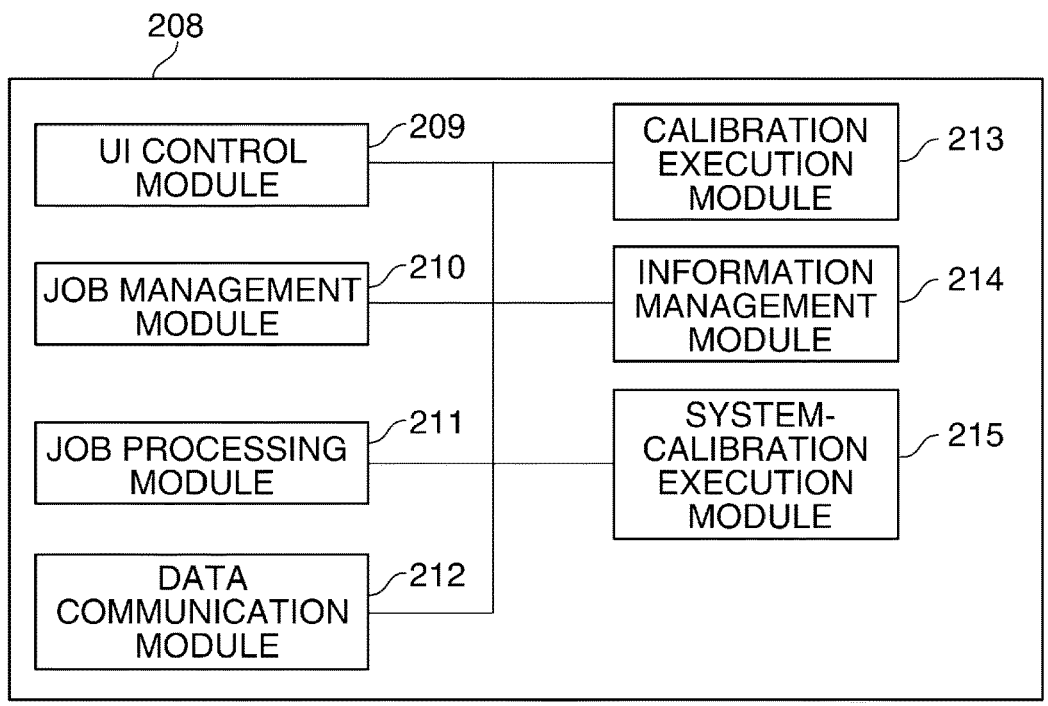

FIG. 2A and FIG. 2B are block diagrams schematically showing configurations of software modules of the MFP 101 and image processing apparatus 102 that constitute the print system 100 in FIG. 1, respectively. FIG. 2A shows the configuration of the software module 200 of the MFP 101 in the first embodiment, and FIG. 2B shows the configuration of the software module 208 of the image processing apparatus 102.

As shown in FIG. 2A, the software module 200 is provided with a UI control module 201, an analysis module 202, a processing module 203, a printing execution module 204, a data communication module 205, a calibration execution module 206, and an information management module 207. Various processes of the software module 200 are performed when the CPU 104 of the MFP 101 runs programs stored in the ROM 105 and the HDD 107.

Figure 3A:
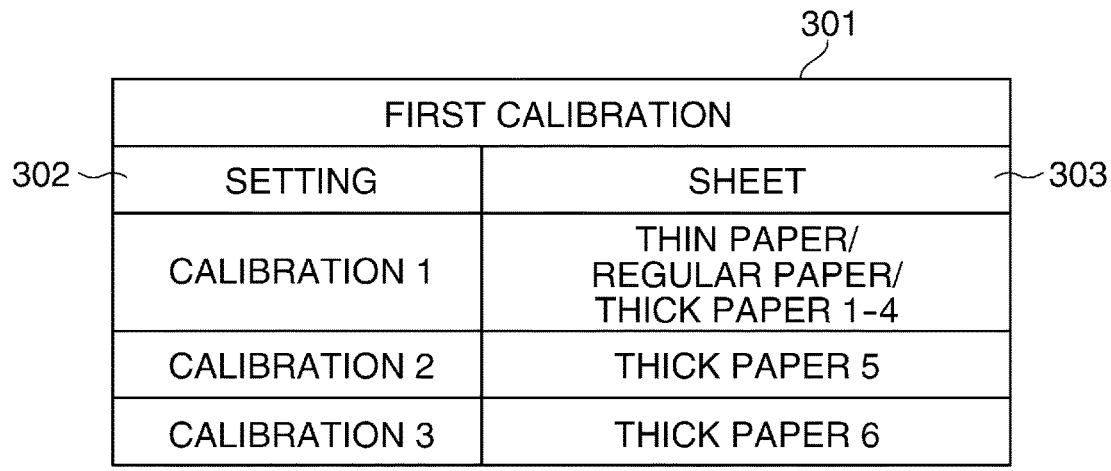
FIG. 3A and FIG. 3B are views showing examples of first setting information and second setting information used in the print system in FIG. 1.

The UI control module 201 receives input information input through the input unit 116, and controls display on the display unit 117. The analysis module 202 analyzes the setting data about printing and image data that are received from the image processing apparatus 102. The processing module 203 controls execution of a process required for printing, such as a halftone process. The printing execution module 204 controls print operations, such as sheet feeding, sheet conveyance, print, and sheet ejection. The data communication module 205 controls communication of data about printing with the image processing apparatus 102. For example, the data communication module 205 sends a measurement result of the sensor 114 and first setting information 301 in FIG. 3A mentioned later to the image processing apparatus 102, and receives print data and third setting information 600 in FIG. 6 mentioned later from the image processing apparatus 102. The calibration execution module 206 controls execution of the first calibration that optimizes image formation related values, such as an addition voltage value of each module of the MFP 101 and an output value of laser power.

The information management module 207 manages information required for execution of the first calibration stored in the HDD 107. The information required for execution of the first calibration includes first compensation target information, a first compensation look-up table (LUT), and the first setting information 301 in FIG. 3A, for example. The first compensation target information includes target values for optimizing the image formation related values, and a plurality of pieces of (for example, three pieces of) first compensation target information are stored in the HDD 107 in the first embodiment. The first compensation LUT includes compensation values for optimizing the image formation related values. In the first embodiment, when execution of the first calibration is instructed, the first compensation LUT is generated and the image formation related values are compensated to values approximated to the first compensation target information on the basis of the first compensation LUT. The first setting information 301 includes first conditioning values showing execution conditions of the first calibration. And the first conditioning values are associated with the pieces of the first compensation target information. The first setting information 301 includes setting fields 302 and sheet fields 303. Character strings indicating the first conditioning values are set to the setting fields 302. The sheet types corresponding to the first conditioning values are set to the sheet fields 303.

As shown in FIG. 2B, the software module 208 is provided with a UI control module 209, a job management module 210, a job processing module 211, a data communication module 212, a calibration execution module 213, an information management module 214, and a system calibration execution module 215. Various processes of the software module 208 are performed when the CPU 122 of the image processing apparatus 102 runs programs stored in the ROM 123 and the HDD 125.

The UI control module 209 receives input information input through the input unit 131, and controls display on the display unit 132. The job management module 210 manages data about a print job received from the client PC 120. Specifically, the job management module 210 calls data about a print job stored in the HDD 125, changes a setting of the print job, and manages the history of the performed print jobs. The job processing module 211 analyzes the print job received from the client PC 120 etc., and generates print data according to the analyzed result. The data communication module 212 controls the data communication between an apparatus connected to the network 119 and the MFP 101. The data communication module 212 sends the print data generated by the job processing module 211 to the MFP 101, for example. The calibration execution module 213 controls execution of the second calibration that optimizes image processing parameters so as to be suitable for the sheet type.

Figure 3B:
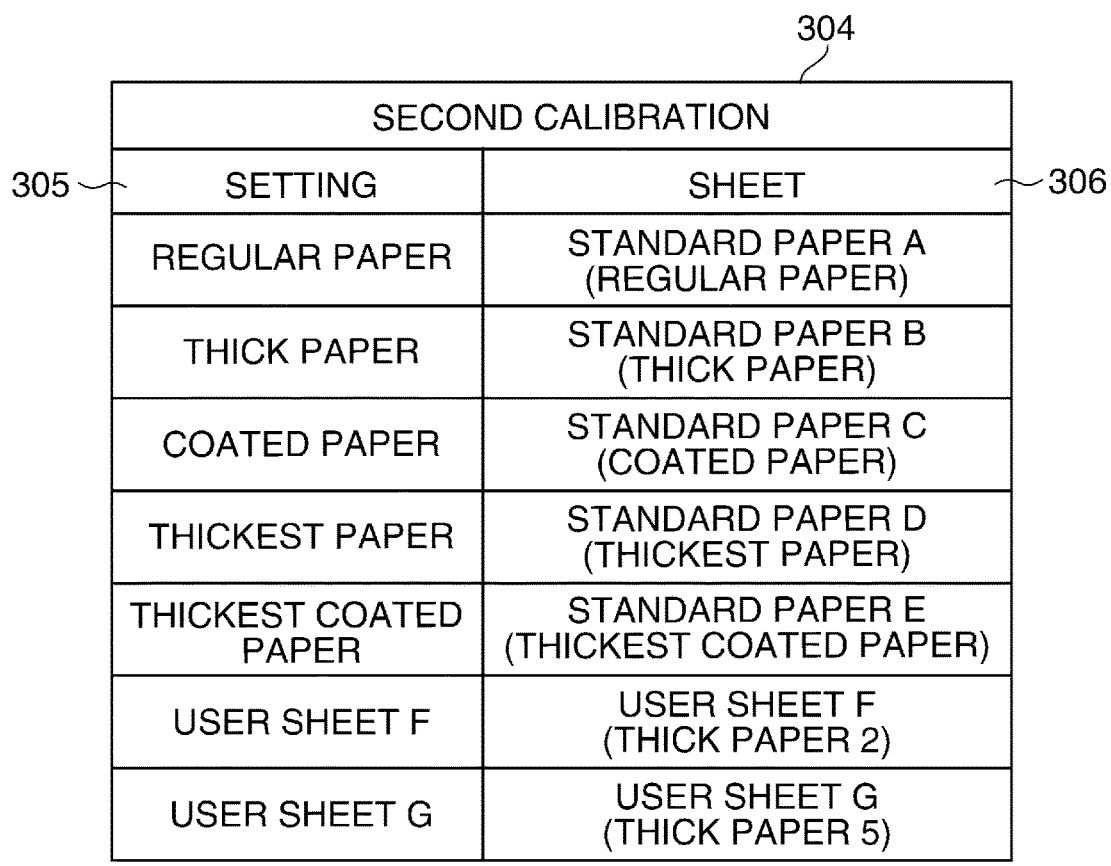

The information management module 214 manages information required for execution of the first calibration stored in the HDD 125. The information required for execution of the second calibration includes second compensation target information, a second compensation LUT, and second setting information 304 in FIG. 3B, for example. The second compensation target information includes target values for optimizing the image processing parameters. At least the number of sheet types supported by the MFP 101, which is a destination of the print data, of pieces (for example, seven pieces) of the second compensation target information are stored in the HDD 125 in the first embodiment. That is, the number of pieces of the second compensation target information is more than the number of pieces of the first compensation target information. The second compensation LUT includes compensation values for optimizing the image processing parameters. In the first embodiment, when execution of the second calibration is instructed, the second compensation LUT is generated and the image processing parameters are compensated to values approximated to the second compensation target information on the basis of the second compensation LUT. The second setting information 304 includes second conditioning values showing execution conditions of the second calibration. And the second conditioning values are associated with the pieces of the second compensation target information. The second setting information 304 includes setting fields 305 and sheet fields 306. The user is able to register setting values to the setting fields 305 and the sheet fields additionally by operating the operation unit 130. Character strings indicating the second conditioning values are set to the setting fields 305, and the sheet types corresponding to the second conditioning values are set to the sheet fields 306. The system calibration execution module 215 manages the execution instruction of the system calibration, and controls execution of the system calibration.

Figure 4:
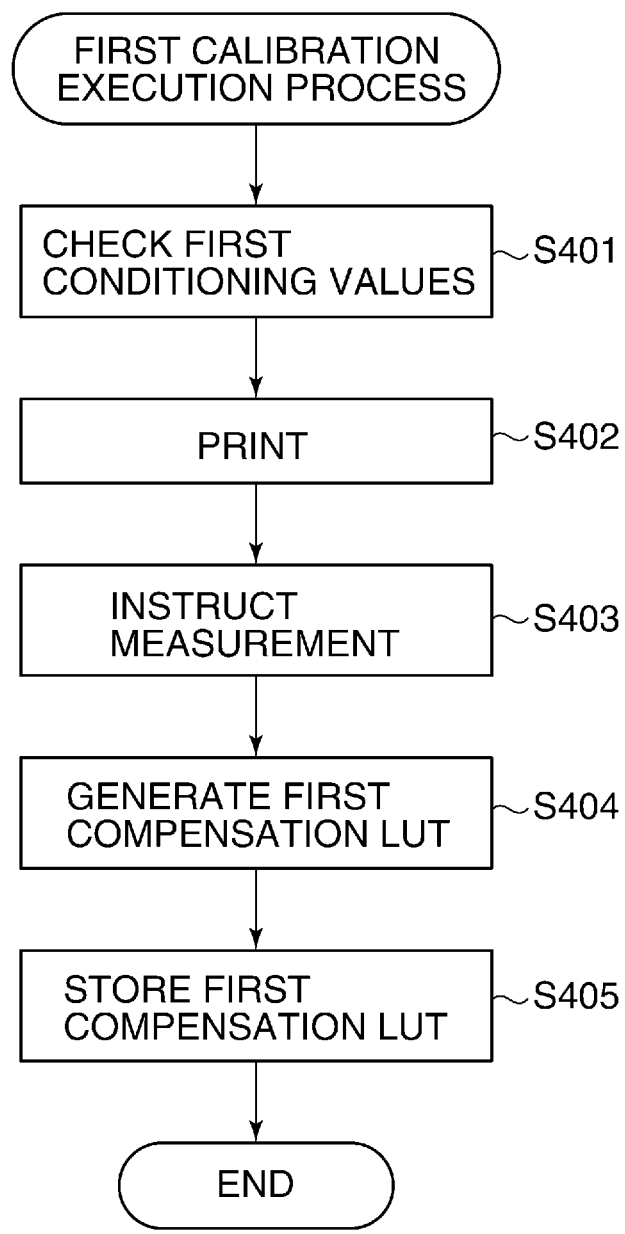
FIG. 4 is a flowchart showing procedures of a first calibration execution process performed by the MFP in FIG. 1.

FIG. 4 is a flowchart showing procedures of a first calibration execution process performed by the MFP 101 in FIG. 1.

The process in FIG. 4 is performed when the CPU 104 of the MFP 101 runs the program stored in the ROM 105 or the HDD 107, and it is premised on the case where the MFP 101 received the execution instruction of calibration including the first conditioning values.

As shown in FIG. 4, the CPU 104 checks the first conditioning values included in the execution instruction received (step S401). Next, the CPU 104 generates print data for printing a measurement chart and prints on the basis of the print data concerned (step S402). Thereby, a plurality of color patches of different colors are printed on a sheet. Next, the CPU 104 instructs measurement to the sensor 114 (step S403). Thereby, the sensor 114 measures the color patches printed on the sheet and sends the measurement results of the color patches to the CPU 104. The CPU 104 obtains the measurement results of the color patches from the sensor 114, and generates the first compensation LUT on the basis of the measurement results of the color patches and the first compensation target information (step S404). Next, the CPU 104 compensates the image formation related values of the MFP 101 on the basis of the first compensation LUT, stores the first compensation LUT into the HDD 107 (step S405), and finishes this process.

Figure 5A:
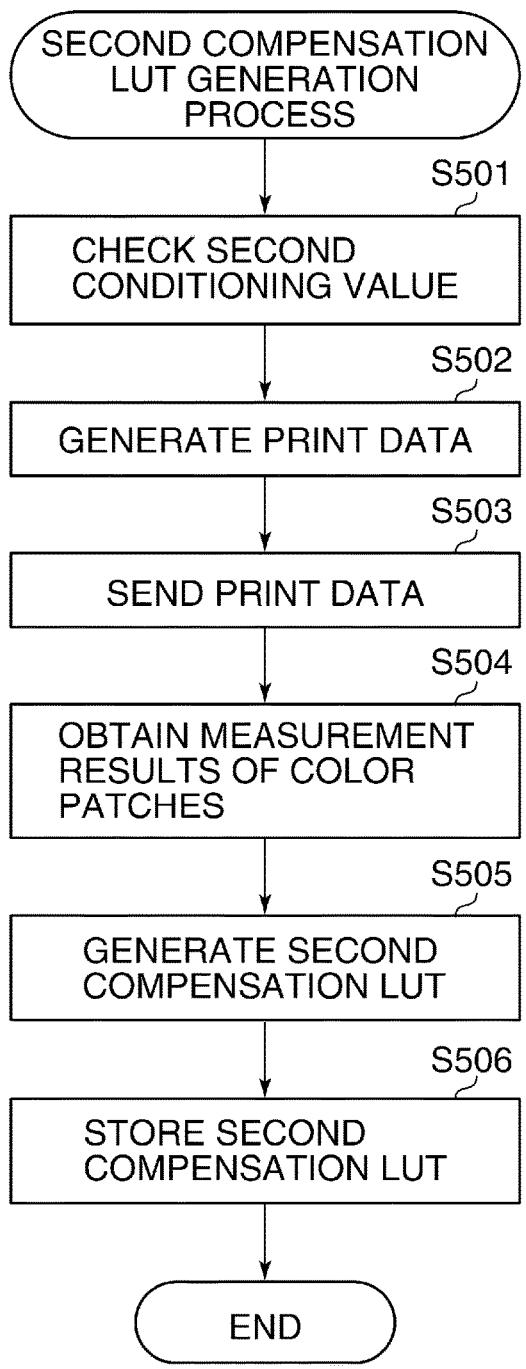
FIG. 5A and FIG. 5B are flowcharts showing procedures of a second calibration execution process performed by the print system in FIG. 1.
Figure 5B:
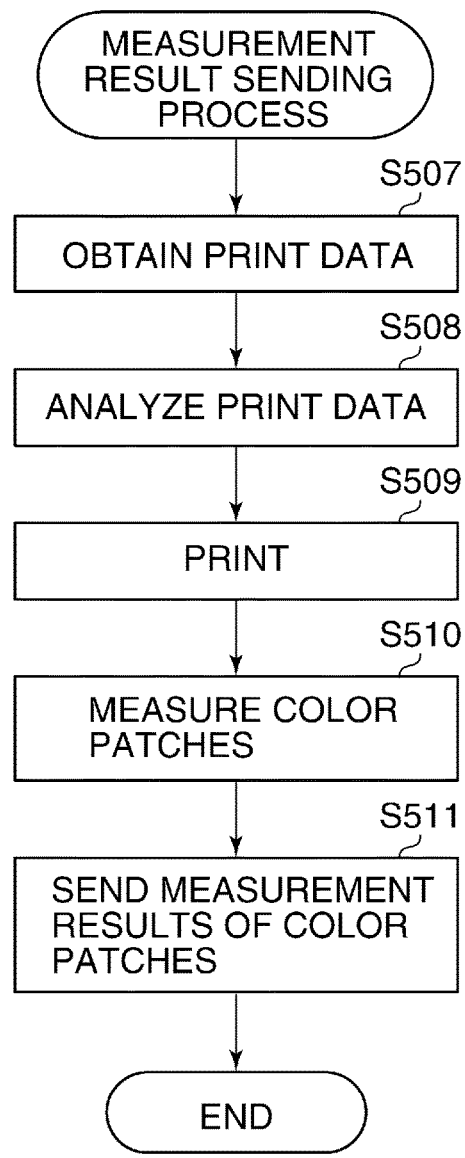

FIG. 5A and FIG. 5B are flowcharts showing procedures of a second calibration execution process performed by the print system 100 in FIG. 1. FIG. 5A shows procedures of a second compensation LUT generation process performed by the image processing apparatus 102 in FIG. 1, and FIG. 5B shows procedures of a measurement result sending process performed by the MFP 101 in FIG. 1.

The process in FIG. 5A is performed when the CPU 122 of the image processing apparatus 102 runs the program stored in the ROM 123 or the HDD 125, and it is premised on the case where the image processing apparatus 102 received the execution instruction of calibration including the second conditioning values. Moreover, the process in FIG. 5B is performed when the CPU 104 of the MFP 101 runs the program stored in the ROM 105 or the HDD 107.

As shown in FIG. 5A, the CPU 122 of the image processing apparatus 102 checks the second conditioning values included in the received execution instruction (step S501), and generates the print data for printing the measurement chart (step S502). Next, the CPU 122 sends the generated print data to the MFP 101 (step S503). Thereby, the MFP 101 performs the process in FIG. 5B, prints the plurality of color patches of the different colors according to the print data on a sheet, measures the printed color patches, and sends the measurement results of the color patches to the image processing apparatus 102. Next, the CPU 122 obtains the measurement results of the color patches from the image processing apparatus 102 (step S504) and generates the second compensation LUT on the basis of the measurement results of the color patches and the second compensation target information (step S505). Next, the CPU 122 compensates the image processing parameters on the basis of the second compensation LUT, stores the second compensation LUT into the HDD 125 (step S506), and finishes this process.

As shown in FIG. 5B, the CPU 104 of the MFP 101 obtains the print data from the image processing apparatus 102 (step S507), analyzes the obtained print data (step S508), and prints according to the print data (step S509). Thereby, the plurality of color patches of the different colors are printed on a sheet. Next, the CPU 104 controls the sensor 114 to measure the color patches (step S510), sends the measurement results of the color patches to the image processing apparatus 102 (step S511), and finishes this process.

Next, the execution of the system calibration will be described.

In the first embodiment, third conditioning values that shows execution conditions of the system calibration are set to third setting information 600 in FIG. 6. The third setting information 600 is generated by the image processing apparatus 102. The image processing apparatus 102 obtains the first setting information 301 from the MFP 101 at the timing when the communication between the MFP 101 and the image processing apparatus 102 starts after the MFP 101 and the image processing apparatus 102 start. The image processing apparatus 102 generates the third setting information 600 on the basis of the first setting information 301 and the second setting information 304 stored in the HDD 125. The generated third setting information 600 is stored into the HDD 125 and is sent to the MFP 101. The image processing apparatus 102 updates the third setting information 600 at the timing when the first calibration is performed or when various setting values in the second setting information 304 are registered additionally.

The third setting information 600 is provided with setting name fields 601, setting fields 602 and 603, and last execution time fields 604. Character strings indicating the third conditioning values are set to the setting name fields 601. The character strings of the conditioning values of which the number is more among the first conditioning values and the second conditioning values are set to the setting name fields 601. In the first embodiment, the same character strings as the second conditioning values are set as the third conditioning values. That is, in the first embodiment, the second conditioning values and the third conditioning values are approximately identical. Character strings corresponding to the values in the setting fields 305 of the second setting information 304 are set to the setting fields 602. The character strings corresponding to the values in the setting fields 302 of the first setting information 301 are set to the setting fields 603. Each of the character strings in the setting fields 603 correspond to the first conditioning value, and the first conditioning value is associated with the third conditioning value for the same sheet type. For example, the first conditioning value of "Calibration 1" corresponding to "Thin paper/Regular paper/Thick paper 1-4" is associated with the third conditioning value of "Regular paper" corresponding to "Regular paper" and the third conditioning value of "User sheet F" corresponding to "Thick paper 2". It should be noted that the number of the first conditioning values is less than the number of the third conditioning values, and each of the first conditioning values is associated with at least one of the third conditioning values. The last execution times of first calibration of the first conditioning values are set to the last execution time fields 604.

In the first embodiment, when the user operates the setting screen 700 in FIG. 7 displayed on the display unit 132 of the image processing apparatus 102, execution of the system calibration is instructed, for example. The setting screen 700 includes a conditioning column 701 and an execution button 702. The third conditioning values (second conditioning values) included in the third setting information 600 are displayed in the conditioning column 701. When the user touches the execution button 702, execution of the system calibration about the third conditioning value selected in the conditioning column 701 is instructed.

Figure 8:
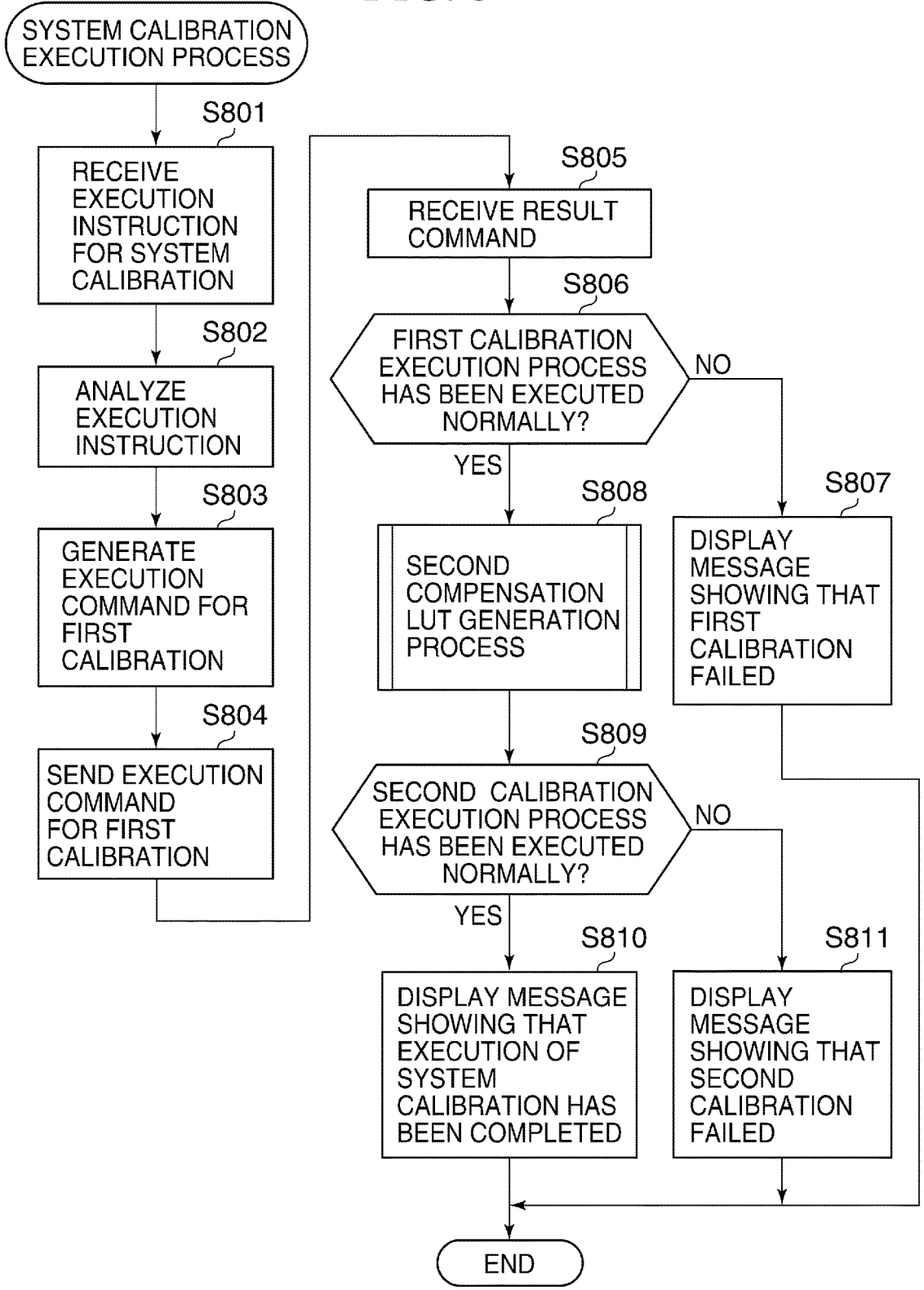
FIG. 8 is a flowchart showing procedures of a system calibration execution process performed by the image processing apparatus in FIG. 1.

FIG. 8 is a flowchart showing procedures of a system calibration execution process performed by the image processing apparatus 102 in FIG. 1.

The process in FIG. 8 is performed when the CPU 122 of the image processing apparatus 102 runs the program stored in the ROM 123 or the HDD 125, and it is premised on the case where the user instructs the execution of the system calibration by the operation through the setting screen 700. The execution instruction of the system calibration includes the third conditioning value (second conditioning value).

As shown in FIG. 8, the CPU 122 receives the execution instruction of the system calibration first (step S801), and analyzes the execution instruction (step S802). Thereby, the CPU 122 specifies the first conditioning value and the second conditioning value on the basis of the third conditioning value (second conditioning value) included in the execution instruction. Next, the CPU 122 generates the execution command of the first calibration on the basis of the specified first conditioning value (step S803). The execution command of the first calibration is a command file that makes the MFP 101 perform the first calibration, and includes the first conditioning value. Next, the CPU 122 sends the execution command of the first calibration to the MFP 101 as the execution instruction of the calibration (step S804). Thereby, the MFP 101 performs a result command sending process in FIG. 9 mentioned below to send a result command showing whether the first calibration execution process has been performed normally to the image processing apparatus 102. Next, the CPU 122 receives the result command from the MFP 101 (step S805) and determines whether the first calibration execution process has been performed normally on the basis of the received result command (step S806).

As a result of the determination in the step S806, when the first calibration execution process has not been performed normally, the CPU 122 displays a message showing that the first calibration failed on the display unit 132 (step S807), and finishes this process. On the other hand, as a result of the determination in the step S806, when the first calibration execution process has been performed normally, the CPU 122 performs the second compensation LUT generation process in FIG. 5A in response to the execution instruction of the system calibration (step S808). Next, the CPU 122 determines whether the second calibration execution process has been performed normally (step S809).

As a result of the determination in the step S809, when the second calibration execution process has been performed normally, the CPU 122 displays a message showing that the system calibration has been completed on the display unit 132 (step S810), and finishes this process. On the other hand, as a result of the determination in the step S809, when the second calibration execution process has not been performed normally, the CPU 122 displays a message showing that the second calibration failed on the display unit 132 (step S811), and finishes this process.

Figure 9:
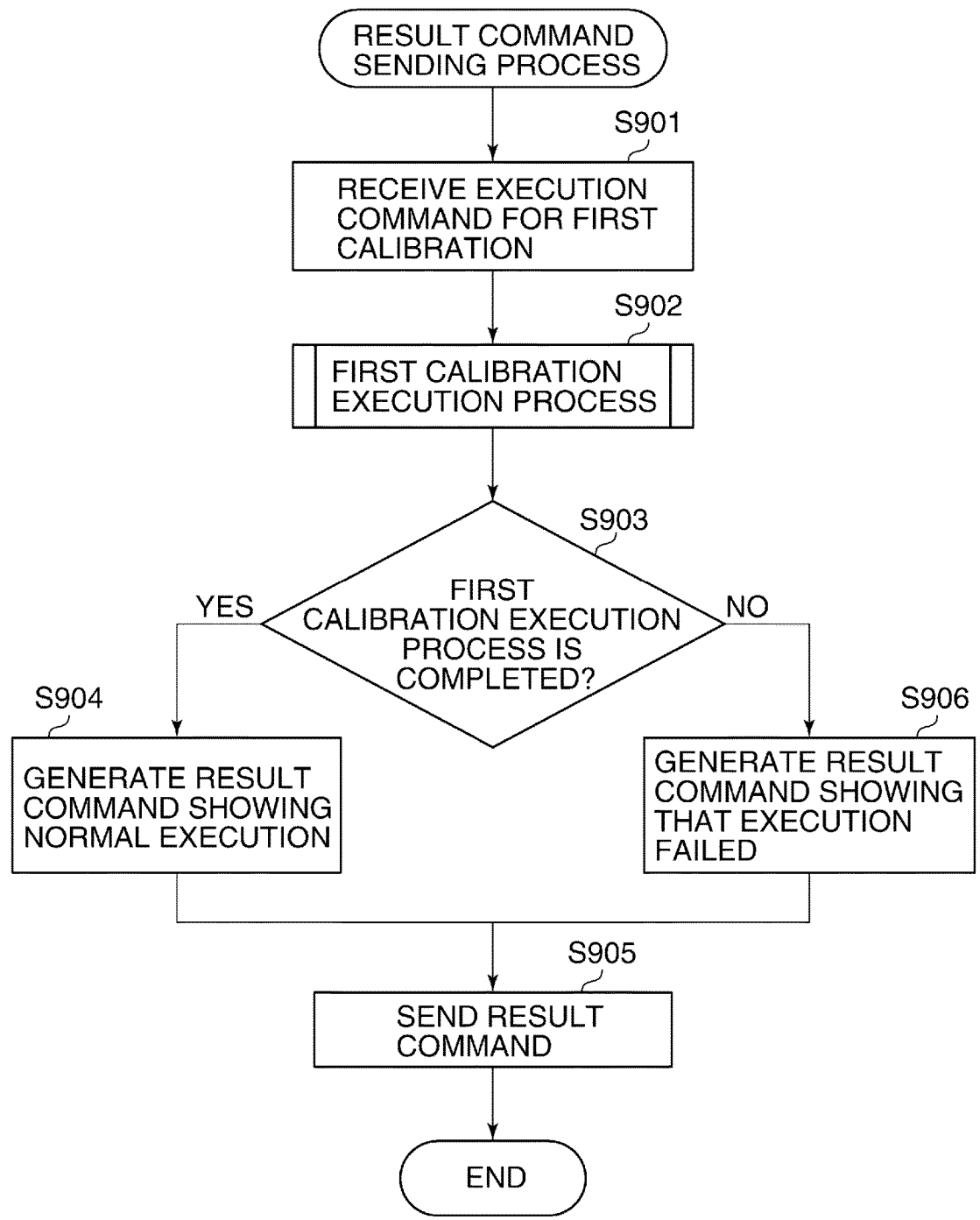
FIG. 9 is a flowchart showing procedures of a result command sending process performed by the MFP in FIG. 1.

FIG. 9 is a flowchart showing procedures of the result command sending process performed by the MFP 101 in FIG. 1.

The process in FIG. 9 is performed when the CPU 104 of the MFP 101 runs the program stored in the ROM 105 or the HDD 107.

As shown in FIG. 9, the CPU 104 receives the execution command of the first calibration from the image processing apparatus 102 (step S901), and performs the first calibration execution process in FIG. 4 (step S902). Next, the CPU 104 determines whether the first calibration execution process completed (step S809).

As a result of the determination in the step S903, when the execution of the first calibration execution process completed, the CPU 104 generates a result command indicating that the execution of the first calibration execution process has been performed normally (step S904). Next, the CPU 104 sends the result command generated to the image processing apparatus 102 (step S905) and finishes this process.

As a result of the determination in the step S903, when the execution of the first calibration execution process does not complete even if a predetermined period elapsed after starting the execution, the CPU 104 generates a result command indicating that the execution of the first calibration execution process failed (step S906). Then, the CPU 104 performs the process in the step S905.

According to the first embodiment mentioned above, the image processing apparatus 102 sends the execution command of the first calibration to the MFP 101 in response to the execution instruction of the system calibration, and the image processing apparatus 102 starts the execution of the second calibration execution process just after receiving the result command indicating that the execution of the first calibration execution process has been performed normally from the MFP 101 (according to reception of the command). Accordingly, since the second calibration is performed certainly after performing the first calibration, the system calibration is performed appropriately.

Moreover, in the first embodiment mentioned above, the first calibration is performed on the basis of the third conditioning values included in the execution instruction of the system calibration, i.e., the execution conditions associated with the second conditioning values. That is, it is not necessary to set up the first conditioning values to the execution instruction of the system calibration. This reduces the time and effort of a user for the setting about the execution instruction of the system calibration.

Although the first embodiment mentioned above describes the case where the setting screen 700 is displayed on the display unit 132, the setting screen 700 may be displayed on a unit other than the display unit 132. For example, the setting screen 700 may be displayed on the display unit 117 of the MFP 101 or the client PC 120. It is enough that the image processing apparatus 102 controls the execution instruction of the system calibration by a user's operation through the setting screen 700.

Moreover, in the first embodiment mentioned above, the third setting information 600 may not include the setting name fields 601, and a plurality of second conditioning values may be displayed on the conditioning column 701 in the setting screen 700.

Furthermore, in the first embodiment mentioned above, it may determine whether the first calibration is performed on the basis of the last execution time of the first calibration.

In the description, the number of the first conditioning values is less than the number of the third conditioning values. Accordingly, the same first conditioning value may be associated with several different third conditioning values in the third setting information 600. For example, the same first conditioning value of "CALIBRATION 1" in the setting fields 603 is associated with the third conditioning values of "REGULAR PAPER" and "USER SHEET F" in the setting name field 601. When the system calibration for "REGULAR PAPER" and the system calibration for "USER SHEET F" are received continuously, the first calibration for "CALIBRATION 1" will be performed continuously. That is, in the first embodiment, a possibility that the execution of the first calibration is instructed with the same conditioning value is high in comparison with the second calibration. Since a calibration is usually performed when peripheral environment of the MFP 101 varies, need for performing the calibration with the same conditioning value at a short interval is extremely low. Since the execution of the calibration takes a certain time period, it is preferable not to perform an unnecessary calibration as possible.

On the other hand, it is determined whether the first calibration is performed on the basis of the last execution time of the first calibration in the first embodiment.

Figure 10:
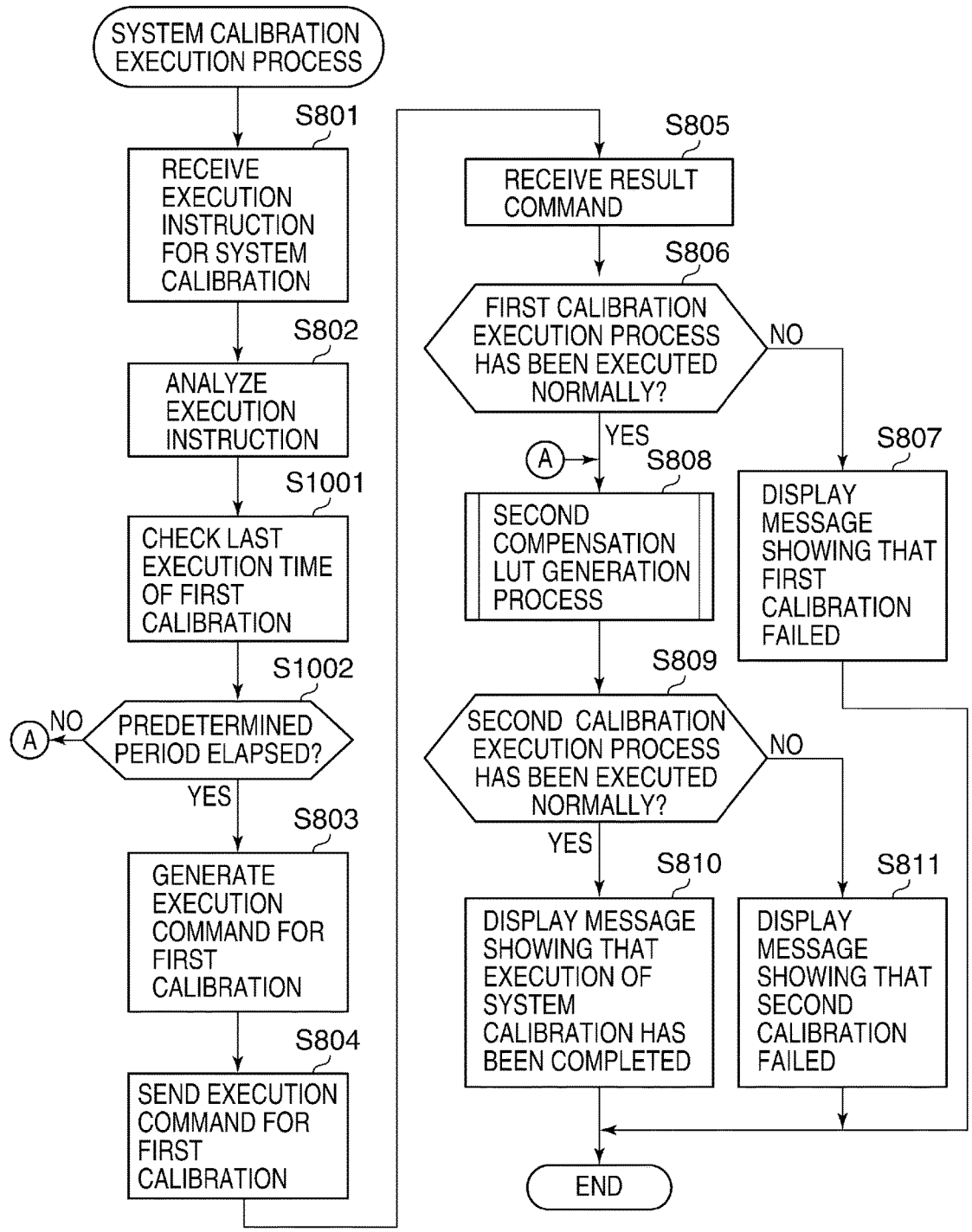
FIG. 10 is a flowchart showing procedures of a modified example of the system calibration execution process in FIG. 8.

FIG. 10 is a flowchart showing procedures of a modified example of the system calibration execution process in FIG. 8.

The process in FIG. 10 is performed when the CPU 122 of the image processing apparatus 102 runs the program stored in the ROM 123 or the HDD 125, and it is premised on the case where the user instructs the execution of the system calibration by the operation through the setting screen 700.

As shown in FIG. 10, the CPU 122 first performs the process in the steps S801 and S802. Next, the CPU 122 checks the last execution time of the first calibration corresponding to the above-mentioned execution instruction on the basis of the third setting information 600 (step S1001). Next, the CPU 122 determines whether a predetermined period elapsed after completing the execution of the first calibration (step S1002).

As a result of the determination in the step S1002, when the predetermined period has not elapsed after completing the execution of the first calibration, the CPU 122 does not perform the first calibration execution process, but performs the process in the step S808 and later. On the other hand, as a result of the determination in the step S1002, when the predetermined period has elapsed after completing the execution of the first calibration, the CPU 122 performs the processing in the step S803 and later.

It is determined whether the first calibration is performed on the basis of the last execution time of the first calibration in the first embodiment mentioned above. This prevents executions of the first calibration with the same conditioning value at a short interval.

Figure 11:
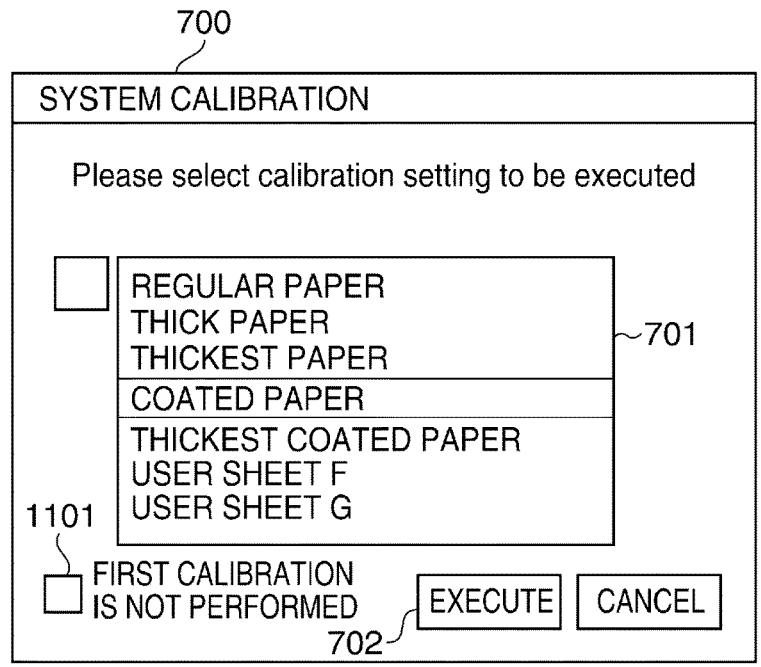
FIG. 11 is a view showing an example of a setting screen displayed on the image processing apparatus in FIG. 1.

Moreover, a check box 1101, which is a choice of whether the first calibration is performed, may be displayed on the setting screen 700 as shown in FIG. 11 in the first embodiment mentioned above. When the execution button 702 is touched under the condition where the third conditioning value is set up in the conditioning column 701 and the check box 1101 is selected, the image processing apparatus 102 determines that the first calibration is not performed in the system calibration. On the other hand, when the execution button 702 is touched under the condition where the third conditioning value is set up in the conditioning column 701 and the check box 1101 is not selected, the image processing apparatus 102 determines that the first calibration is performed in the system calibration.

This reflects a user's intention to the determination of execution of the first calibration in the system calibration, and accordingly, the system calibration is performed flexibly.

Furthermore, the check box 1101 may be displayed in the setting screen 700 when the predetermined period elapsed after performing the first calibration in the first embodiment mentioned above. This enables to establish the prevention of the first calibration with the same set value at a short interval and the flexible processing of the system calibration.

Next, a second embodiment of the present invention will be described.

Configurations and functions of the second embodiment of the present invention are fundamentally identical to that of the first embodiment mentioned above. However, the MFP 101 in the second embodiment differs from that in the first embodiment of the present invention in that the MFP 101 in the second embodiment is provided with a sensor control module. Hereinafter, the descriptions about the duplicate configurations and functions are omitted, and different configurations and functions will be described.

Figure 12:
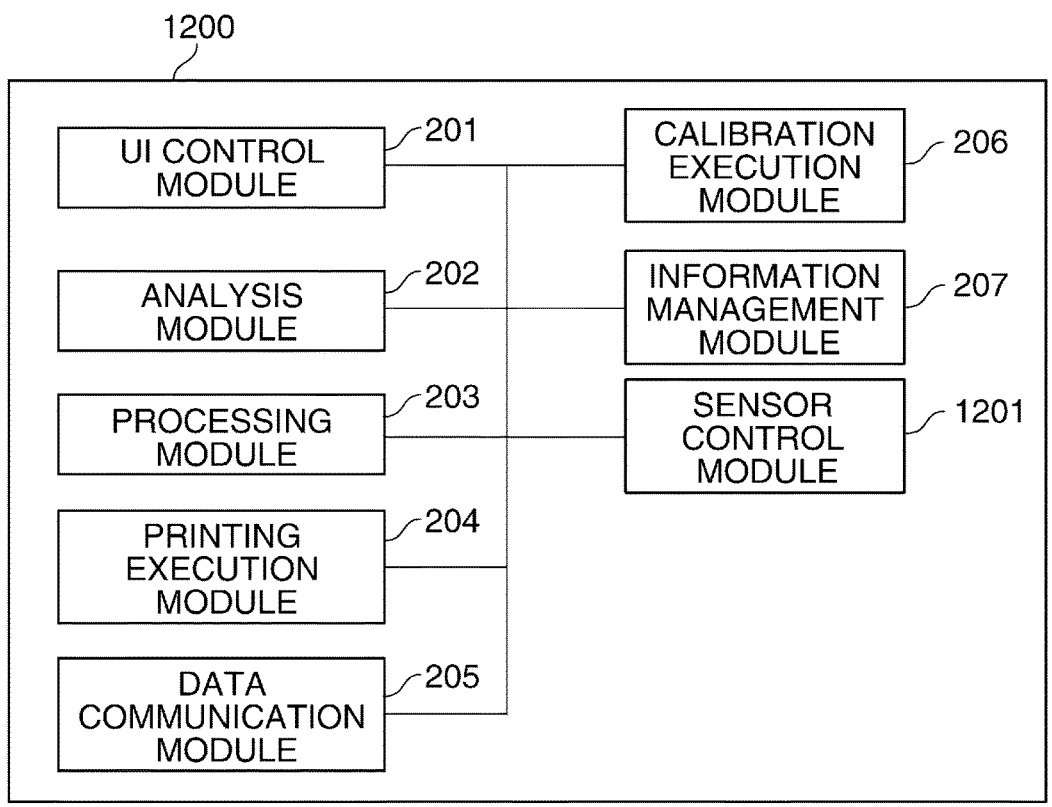
FIG. 12 is a block diagram schematically showing a configuration of software modules of an MFP according to a second embodiment of the present invention.

FIG. 12 is a block diagram schematically showing a configuration of a software module 1200 of the MFP 101 according to the second embodiment.

As shown in FIG. 12, the software module 1200 is provided with the sensor control module 1201 in addition to the modules of the software module 200. Each process of the software module 1200 is performed when the CPU 104 of the MFP 101 runs a program stored in the ROM 105 or the HDD 107.

The sensor control module 1201 controls execution of each process about measurement with the sensor 114. For example, the sensor control module 1201 controls executions of preparing actions of the sensor 114 performed before measurement. The preparing actions include a connection check action between the sensor 114 and the sensor I/F 110, a warm-up action that makes a light source (not shown) of the sensor 114 emit light compulsorily until stabilizing self temperature rise of the light source, a light-amount adjusting action that adjusts the light amount of the light source, and a reading-abnormality detecting action for the sensor 114, for example. In the reading-abnormality detecting action for the sensor 114, the sensor 114 measures a white reference plate (not shown) that is arranged near the sensor 114, and it is checked whether a measurement value falls within a certain reference range in order to detect the reading abnormality of the sensor 114.

Figure 13:
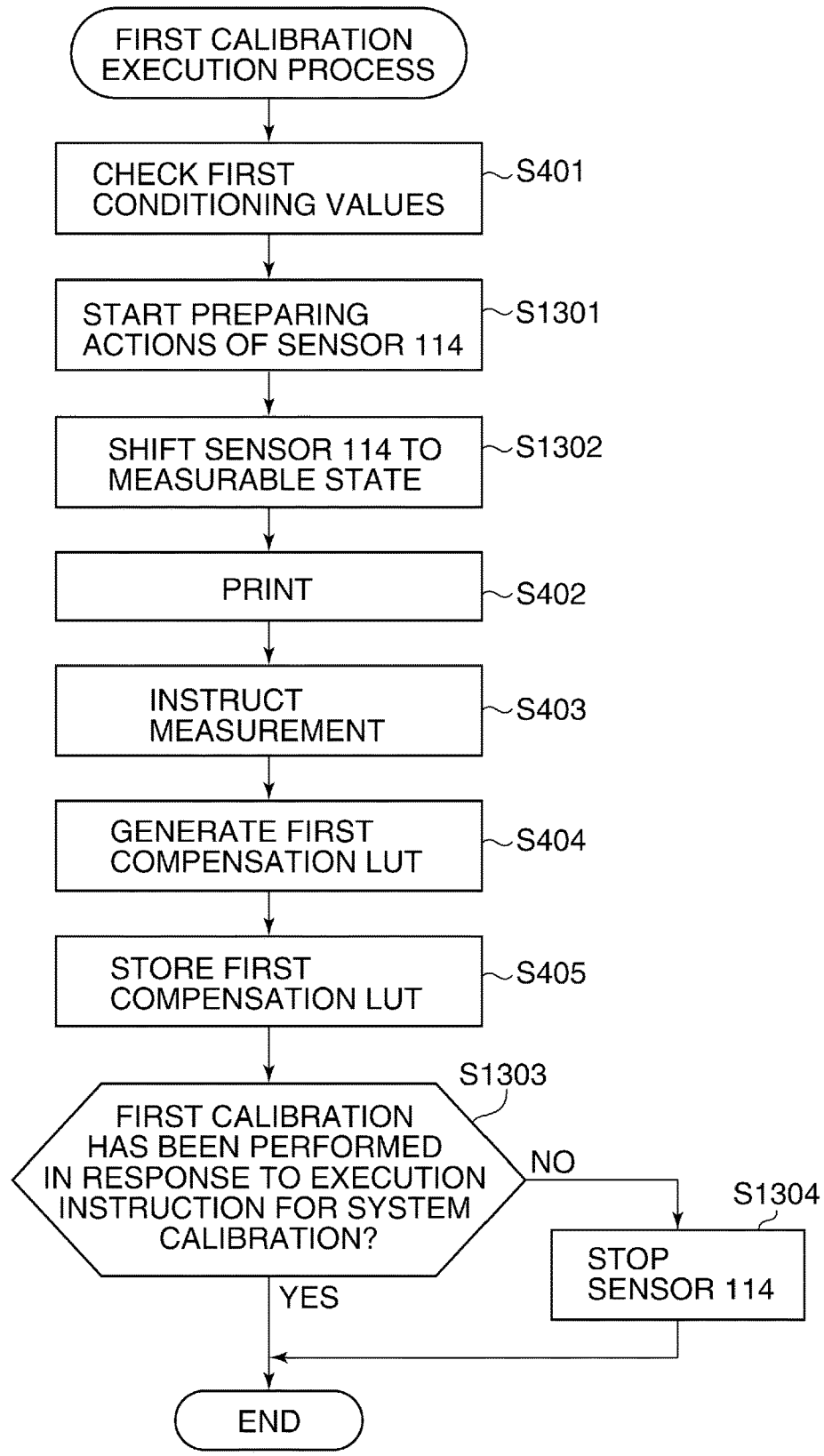
FIG. 13 is a flowchart showing procedures of a modified example of the first calibration execution process in FIG. 4.

FIG. 13 is a flowchart showing procedures of a modified example of the first calibration execution process in FIG. 4.

The process in FIG. 13 is performed when the CPU 104 of the MFP 101 runs the program stored in the ROM 105 or the HDD 107, and it is premised on the case where the MFP 101 received the execution instruction of calibration including the first conditioning values.

In the print system 100, the preparing actions for the sensor 114 are performed as advance preparations of the measurement of the color patches at the time of performing the first calibration and the second calibration. When the preparing actions are completed, the sensor 114 shifts to a measurable state (detectable state) and enables measurement of the color patches. The execution of the preparing action takes a period of about tens of seconds. The print system 100 is preferable to complete the execution of the calibration as soon as possible after the execution of the calibration is instructed. Accordingly, the number of executions of the preparing actions should be necessary minimum. Moreover, since the machine life of the sensor 114 becomes shorter whenever the number of executions of the preparing action increases, it is necessary to make the number of executions of the preparing action be necessary minimum also from a point of view that reduces degradation of the machine life of the sensor 114.

Corresponding to this, in this modified example, when the sensor 114 shifts to the measurable state at the time of performing the first calibration in response to the execution instruction of the system calibration, the measurable state is maintained until the executions of all pieces of the calibration corresponding to the execution instruction of the system calibration are completed.

As shown in FIG. 13, the CPU 104 first performs the process in step S401. Next, the CPU 104 starts the preparing actions of the sensor 114 (step S1301), and makes the sensor 114 shift to the measurable state (step S1302). Thereby, the sensor 114 becomes possible to measure the color patches, and the MFP 101 does not need the preparing actions of the sensor 114 unless the sensor 114 is stopped. Then, the CPU 104 performs the process in the steps S402 through S405. Next, the CPU 104 determines whether the first calibration has been performed in response to the execution instruction of the system calibration (step S1303).

As a result of the determination in the step S1303, when the first calibration has been performed in response to the execution instruction of the system calibration, the CPU 104 finishes this process while keeping the sensor 114 in the measurable state. On the other hand, when the execution of the first calibration has not been performed in response to the execution instruction of the system calibration, the CPU 104 stops the sensor 114 (step S1304), and finishes this process.

Figure 14:
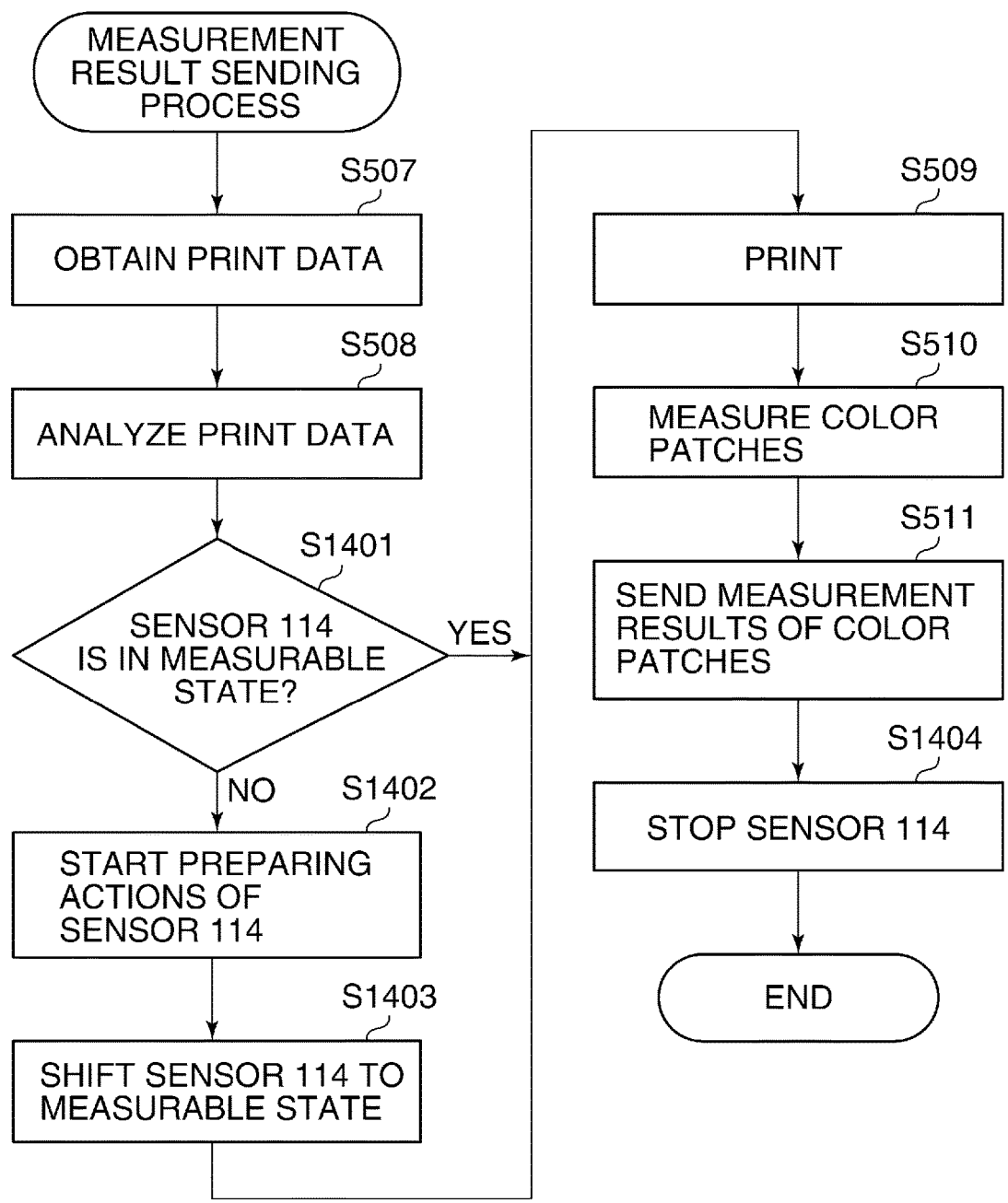
FIG. 14 is a flowchart showing procedures of a modified example of the measurement result sending process in FIG. 5B.

FIG. 14 is a flowchart showing procedures of a modified example of the measurement result sending process in FIG. 5B.

The process in FIG. 14 is performed when the CPU 104 of the MFP 101 runs the program stored in the ROM 105 or the HDD 107. The process in FIG. 14 is premised on the case where the image processing apparatus 102 receives the execution instruction, which includes the second conditioning values, for the calibration.

As shown in FIG. 14, the CPU 104 first performs the process in the steps S507 and S508. Next, the CPU 104 determines whether the sensor 114 is in the measurable state (step S1401).

As a result of the determination in the step S1401, when the sensor 114 is in the measurable state, the CPU 104 does not perform the preparing actions of the sensor 114 but performs the process in the steps S509 through S511 because the preparing actions of the sensor 114 are unnecessary. On the other hand, as a result of the determination in the step S1401, when the sensor 114 is not in the measurable state, the CPU 104 starts the preparing actions of the sensor 114 (step S1402), and makes the sensor 114 shift to the measurable state (step S1403). Then, the CPU 104 performs the process in the steps S509 through S511. Next, the CPU 104 stops the sensor 114 (step S1404), and finishes this process.

When the sensor 114 shifts to the measurable state by performing the first calibration in response to the execution instruction of the system calibration, the measurable state is maintained until executions of all pieces of the calibration corresponding to the execution instruction of the system calibration are completed. This reduces the delay of execution of the calibration and the degradation of machine life of the sensor 114 that are caused by unnecessary preparing operations.

Moreover, the sensor 114 may be stopped when a predetermined state sustained period elapsed after performing the first calibration. This prevents the sensor 114 from continuing the action more than needed in order to reduce the executions of the preparing actions, and accordingly, the increase in the power consumption of the sensor 114 is reduced.

Moreover, the preparing actions include at least one of the connection check action of the sensor 114, the warm-up action of the light source of the sensor 114, the light-amount adjusting operation that adjusts the light amount of the light source, and the reading abnormality detecting action of the sensor 114. This certainly reduces the delay of execution of the calibration and the degradation of machine life of the sensor 114 that are caused by the connection check action of the sensor 114, the warm-up action of the light source of the sensor 114, the light-amount adjusting operation that adjusts the light amount of the light source, and the reading abnormality detecting action of the sensor 114.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-218972, filed Nov. 9, 2016, which is hereby incorporated by reference herein in its entirety.

What is claimed is:

1. A print system comprising:
a printing apparatus configured to perform a first calibration for generating a first calibration data including an image formation value;
an image processing apparatus configured to perform a second calibration for generating a second calibration data, including an image processing parameter, associated with a sheet type;
at least one memory configured to store instructions; and
at least one processor configured to execute the instructions to:
manage an execution instruction of system calibration that performs the first calibration and the second calibration continuously in order of the first calibration by the printing apparatus and the second calibration by the image processing apparatus;
send an execution command for performing the first calibration based on the execution instruction of the system calibration to the printing apparatus from the image processing apparatus;
send a notice showing that execution of the first calibration in response to the execution command was completed from the printing apparatus to the image processing apparatus; and
start execution of the second calibration when the image processing apparatus receives the notice.

2. The print system according to claim 1,
wherein the execution instruction of the system calibration includes an execution condition of the second calibration,
wherein the second calibration is performed based on the execution condition of the second calibration, and
wherein the first calibration is performed based on the execution condition associated with the execution condition of the second calibration.

3. The print system according to claim 1,
wherein execution time of the first calibration is managed, and
wherein it is determined whether the first calibration is performed based on the execution time of the first calibration.

4. The print system according to claim 1,
wherein a setting screen that receives the execution instruction of the system calibration is displayed, and
wherein a choice of whether the first calibration is performed is displayed in the setting screen when a predetermined period elapses after performing the first calibration.

5. The print system according to claim 1,
wherein the printing apparatus further comprises a detection device configured to shift to a detectable state by performing a predetermined action at a time of each execution of the first calibration and the second calibration, and
wherein the detection device is configured to keep the measurable state until the executions of all pieces of the calibration corresponding to the execution instruction of the system calibration are completed, when the detection device shifts to the measurable state at the time of performing the first calibration in response to the execution instruction of the system calibration.

6. The print system according to claim 5, wherein the detection device is configured to be stopped when a predetermined state sustained period elapses after performing the first calibration.

7. The print system according to claim 5,
wherein the detection device is a sensor equipped with a light source, and
wherein the predetermined action comprises at least one of a connection check action of the sensor, a warm-up action of the light source of the sensor, a light-amount adjusting action that adjusts a light amount of the light source, and a reading abnormality detecting action of the sensor.

8. An image processing apparatus comprising:
a communication interface configured to communicate with a printing apparatus that controls execution of a first calibration for generating a first calibration data including an image formation value;
at least one memory configured to store instructions; and
at least one processor configured to execute the instructions to:
control execution of a second calibration for generating a second calibration data, including an image processing parameter, associated with a sheet type, wherein the second calibration differs from the first calibration;
manage an execution instruction of system calibration that performs the first calibration and the second calibration continuously in order of the first calibration and the second calibration;
send an execution command for performing the first calibration based on the execution instruction of the system calibration to the printing apparatus;
receive a notice showing that execution of the first calibration in response to the execution command was completed from the printing apparatus; and
start execution of the second calibration when the notice is received.

9. The image processing apparatus according to claim 8,
wherein the execution instruction of the system calibration includes an execution condition of the second calibration,
wherein the second calibration is performed based on the execution condition of the second calibration, and
wherein the first calibration is performed based on the execution condition associated with the execution condition of the second calibration.

10. The image processing apparatus according to claim 8,
wherein execution time of the first calibration is managed, and
wherein it is determined whether the first calibration is performed based on the execution time of the first calibration.

11. The image processing apparatus according to claim 8,
wherein a setting screen that receives the execution instruction of the system calibration is displayed, and
wherein a choice of whether the first calibration is performed is displayed in the setting screen when a predetermined period elapses after performing the first calibration.

12. A calibration control method for a print system equipped with a printing apparatus configured to perform a first calibration for generating a first calibration data including an image formation value and an image processing apparatus configured to perform a second calibration for generating a second calibration data including an image processing parameter associated with a sheet type, the calibration control method comprising:
managing an execution instruction of system calibration that performs the first calibration and the second calibration continuously in order of the first calibration by the printing apparatus and the second calibration by the image processing apparatus;

sending an execution command for performing the first calibration based on the execution instruction of the system calibration to the printing apparatus from the image processing apparatus;

sending a notice showing that execution of the first calibration in response to the execution command was completed from the printing apparatus to the image processing apparatus; and starting execution of the second calibration when the image processing apparatus receives the notice.

13. A non-transitory computer-readable storage medium storing a control program causing a computer to execute a calibration control method for a print system equipped with a printing apparatus configured to perform a first calibration for generating a first calibration data including an image formation value and an image processing apparatus configured to perform a second calibration for generating a second calibration data including an image processing parameter associated with a sheet type, the calibration control method comprising:

managing an execution instruction of system calibration that performs the first calibration and the second calibration continuously in order of the first calibration by the printing apparatus and the second calibration by the image processing apparatus;

sending an execution command for performing the first calibration based on the execution instruction of the system calibration to the printing apparatus from the image processing apparatus;

sending a notice showing that execution of the first calibration in response to the execution command was completed from the printing apparatus to the image processing apparatus; and starting execution of the second calibration when the image processing apparatus receives the notice.

* * * * *